United States Patent
Pryor

[15] 3,654,971
[45] Apr. 11, 1972

[54] SAWMILL
[72] Inventor: Frank H. Pryor, Angle Street, Fredericksburg, Ohio 44627
[22] Filed: Mar. 21, 1969
[21] Appl. No.: 809,246

[52] U.S. Cl. ....................143/52 R, 143/157 E
[51] Int. Cl. .....................B27b 7/00, B27b 31/00
[58] Field of Search............143/157, 157 D, 52–54, 143/25; 144/246

[56] References Cited

UNITED STATES PATENTS 1,795,137  3/1931  Nye ........................................144/246
1,867,873  7/1932  Browne..............................143/157 D
2,468,036  4/1949  Charters ............................143/157 D

*Primary Examiner*—Donald R. Schran
*Attorney*—Schmieding and Fultz

[57] ABSTRACT

A sawmill of the type which can be controlled by a single operator from a central control station which is characterized by a novel conveyor apparatus which is uniquely adapted for three-way delivery of sawn boards from a cutting station. The sawmill is further characterized by a remote control apparatus that enables the operator to selectively deliver sawn timbers from either side of the discharge end of said conveyor or, if desired, straight from the end of the conveyor in the direction of axial extent thereof.

12 Claims, 6 Drawing Figures

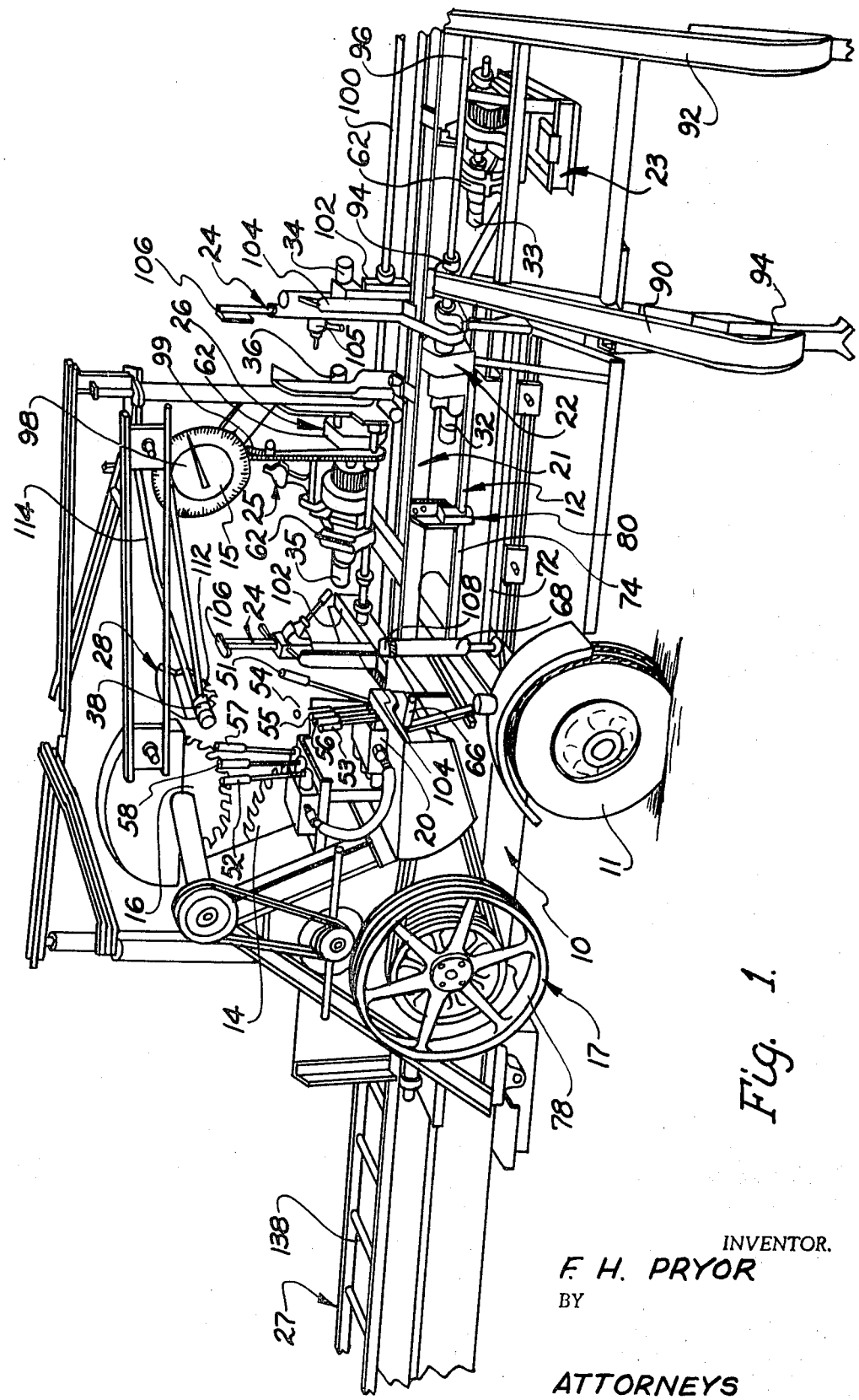

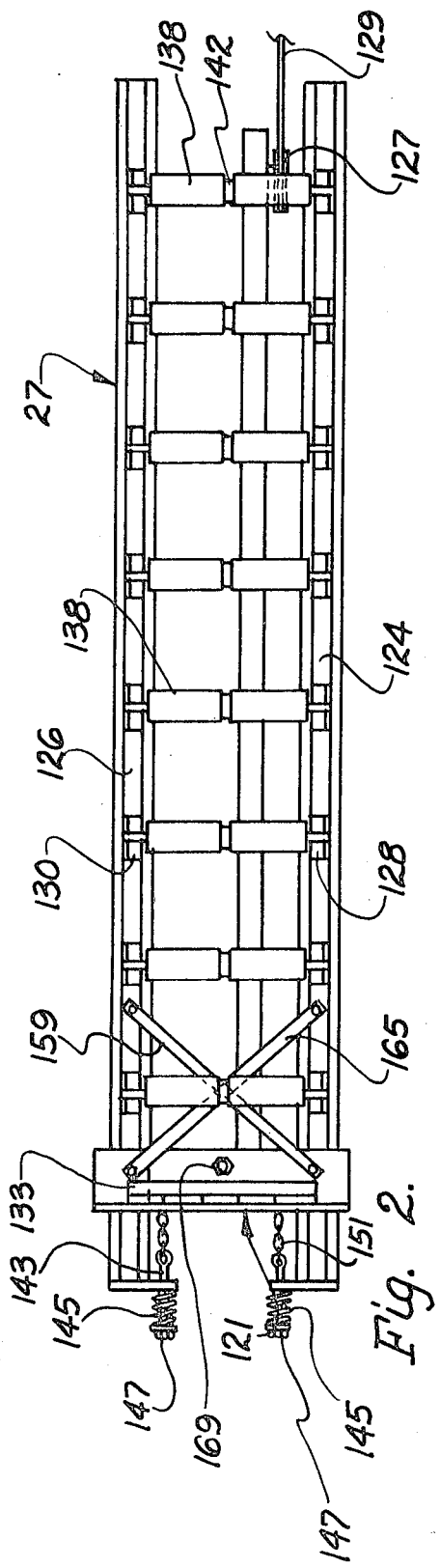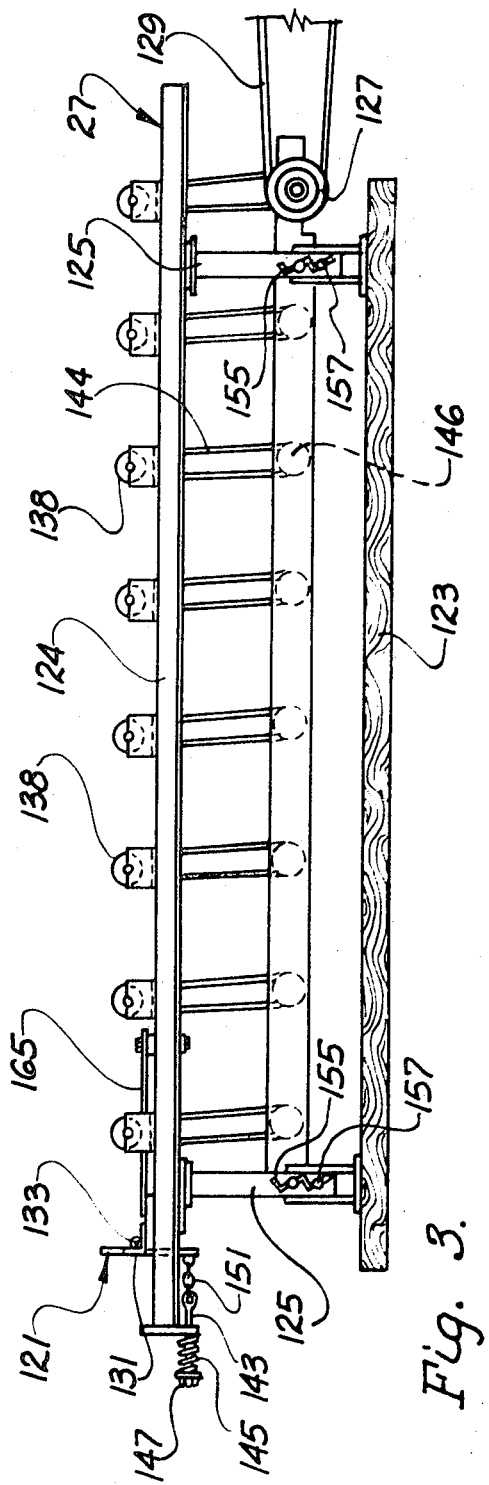

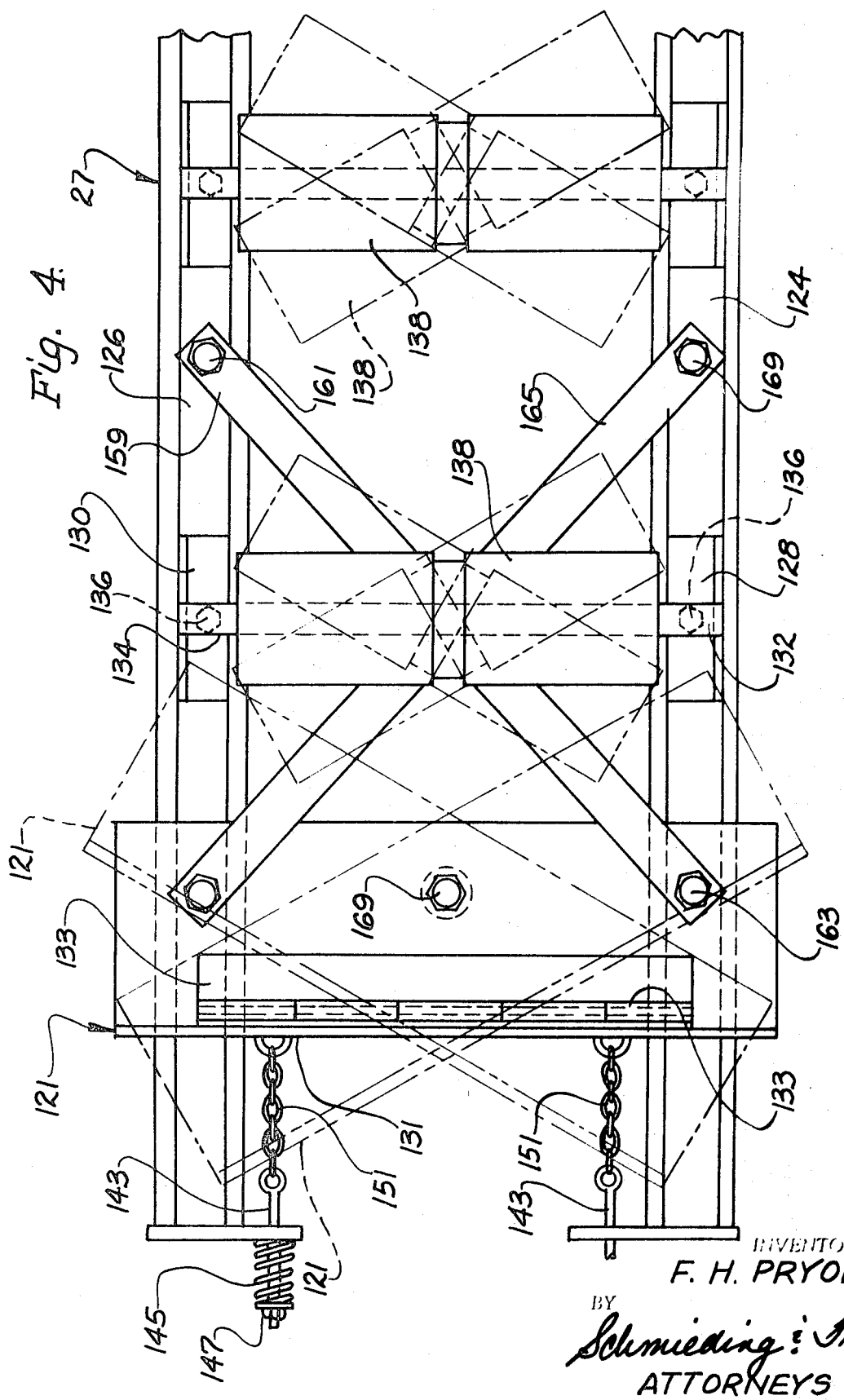

INVENTOR.
F. H. PRYOR
BY Schmieding & Fultz
ATTORNEYS

SAWMILL

This invention relates generally to sawmills and more particularly to a mill that is adapted for one man operation from a single control station.

In general, the sawmill of the present invention comprises a main frame means for supporting associated components and a control station from which a single operator can control all of the recessory timber handling and sawing functions, including the delivery of sawn board from the sawing station.

More specifically the new sawmill apparatus is uniquely adapted for central control station operation including individual control means for each of the following apparatus that perform respective individual functions as follows: (1) a timber supporting carriage that is movable along a track means to and through the sawing station; (2) a live deck apparatus for delivery timbers to the carriage; (3) a log turning apparatus for rotatably positioning timbers on the carriage; (4) a log engaging dog mechanism for clamping the timbers on the carriage; (5) a set mechanism on the carriage for laterally moving and precisely positioning a timber with respect to the cutting path; (6) a receder mechanism on the carriage for laterally moving a timber away from the cutting path; (7) a conveyor beyond the track means for receiving and delivering boards from the cutting path; (8) a log cleaner mechanism for pre-cleaning a longitudinal path along the outer surface of a timber at the location to be engaged by the saw blade.

In accordance with the present invention a novel three-way conveyor apparatus is provided with an associated remote control system that permits the selective delivery of articles from either side of the discharge end of the conveyor, or straight off the end in the direction of axial extent of the conveyor.

In accordance with another aspect of the present invention the conveyor apparatus is provided with a variable angle discharge guide that is automatically positioned from a remote control station so as to co-operate with the driven rollers of the conveyor to effect said three discharge functions.

As still another aspect of the present invention, a single station sawmill is provided that incorporates the above mentioned three-way delivery conveyor system into a central operating station of a sawmill adapted for single operator actuation.

It is therefore a primary object of the present invention to provide a novel three-way delivery conveyor apparatus that is adapted to selectively deliver articles from either side thereof, or straight off the end of the conveyor in the direction of axial extension thereof.

It is another object of the present invention to provide a sawmill that includes a novel three-way delivery conveyor mechanism whereby sawn boards can selectively be delivered as described above by a single operator actuating conveyor or control means from a central operating station from which associated sawmill operating functions are effected.

Further objects and advantages of the present invention will be apparent from the following description, reference being had to the accompanying drawings wherein a preferred form of embodiment of the invention is clearly shown.

IN THE DRAWINGS

FIG. 1 is a perspective view of a sawmill constructed in accordance with the present invention;

FIG. 2 is a top elevational view of a three-way delivery conveyor apparatus constructed in accordance with the present invention;

FIG. 3 is a side elevational view of the conveyor apparatus of FIG. 2;

FIG. 4 is a partial top elevational view of the discharge end of the conveyor of the preceeding figures;

Figure 5:
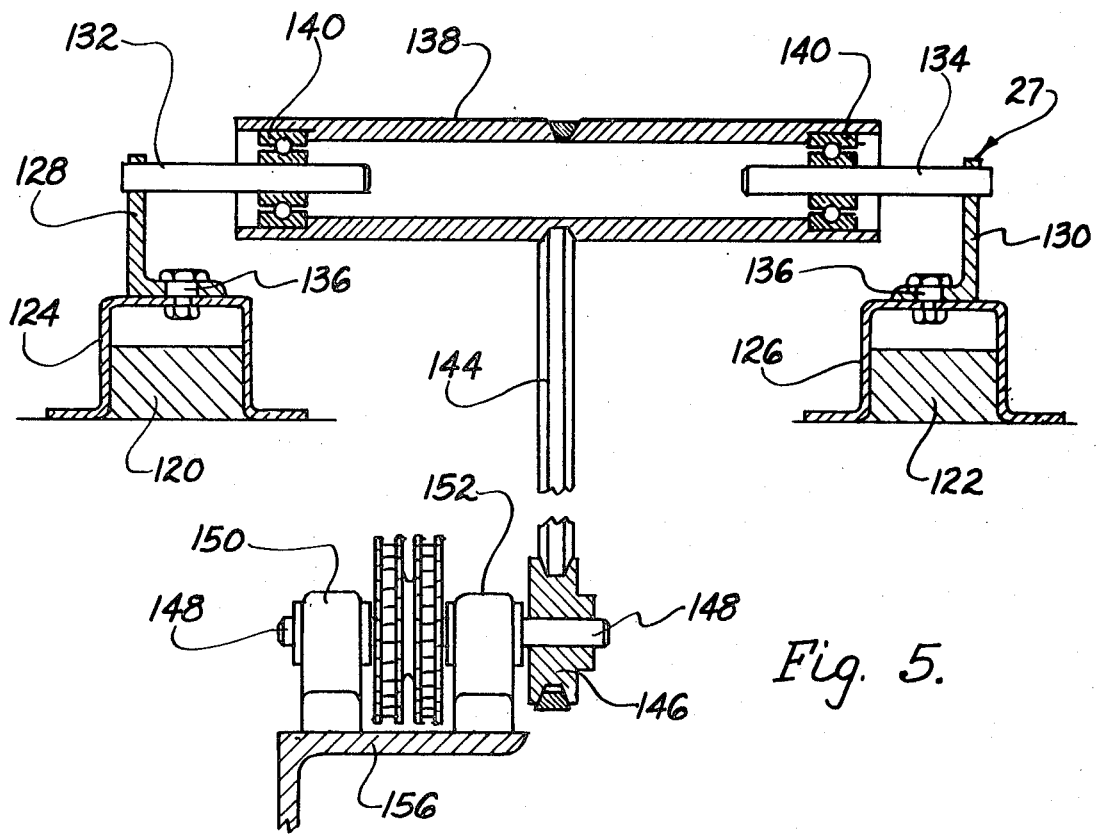
FIG. 5 is a sectional view of the driven rollers and drive of the conveyor of the preceeding figures, the section being taken along the line 5—5 of FIG. 3.

Referring in detail to the drawings, a sawmill constructed in accordance with the present invention is illustrated in FIG. 1 and includes a frame means indicated generally at 10. The apparatus further includes a central control station 20 that is located adjacent a track means indicated generally at 12 which includes spaced tracks 72 and 74 that extend longitudinally along a cutting path, the latter being defined by the position of a main saw blade 14 rotatably mounted on frame means 10 and driven by a drive mechanism indicated generally at 17. A top saw blade 16 may also be utilized for increasing the depth of cut for relatively thick timbers. An engine, not illustrated, provides power for driven pulley 78, the latter comprising a portion of drive mechanism 17.

As seen in FIG. 1, a carriage hold-down assembly indicated generally at 80 functions to assure that carriage 12 is retained on the track and serves the additional function of a track cleaning apparatus. Such hold-down assembly 80 is described in detail in my co-pending application Ser. No. 809,105 filed Mar. 21, 1969.

Timber supporting carriage 21, including timber engaging surfaces 104 and 105, is extended and retracted along the track means 12 by means of a winch mechanism, not illustrated, that functions to extend and retract a cable attached to the ends of the carriage, said cable being extended around pulleys mounted on the frame. It should be mentioned that the winch is driven by a carriage fluid motor in the hydraulic control system as is described in detail in my co-pending application Ser. No. 809,169 filed Mar. 21, 1969.

With continued reference to FIG. 1, the sawmill further includes a live deck apparatus, indicated generally at 22 that functions to deliver timbers to the previously mentioned carriage 21. Such apparatus comprises spaced endless belt means 90 and 92 which are mounted on and driven by pulleys 94 mounted on a shaft 96, the latter being driven by a gear box 62 and a live deck fluid motor 32.

Reference is next made to a log turner apparatus indicated generally at 23 which functions to automatically rotate the timbers about their longitudinal axes, thereby permitting the operator to properly position them on the carriage. Log turner apparatus 23 is driven by a gear box 62 and fluid motor 33.

The sawmill is further provided with timber clamping means in the form of dog mechanisms indicated generally at 24. Such mechanisms are mounted on upper carriage portion 102 and includes hooks or projections 106 which serve to engage the top surface of the timber and retain it rigidly in position. It should be pointed out that dog hooks 106 are driven vertically by a fluid motor 34.

With continued reference to FIG. 1 a set mechanism indicated generally at 25 is mounted on carriage 21 and provides means whereby the operator can laterally move and precisely position a timber with respect to the cutting path established by saw blades 14 and 16. The set mechanism 25 further includes a setting gauge 98 driven by a chain 99 provided with indicia in fractions of an inch whereby the operator can precisely position a timber to establish the width of board to be cut. Set apparatus 25 drives a set shaft 100 which is in turn driven by the gear box 62 and fluid motor 35 of the set apparatus.

When set mechanism 25 rotates set shaft 100 in one direction, then a laterally movable upper carriage portion 102, provided with log positioning surfaces 104 and 105, is driven laterally toward the cutting path in the direction of control station 20.

Carriage 21 is further provided with a receder mechanism indicated generally at 26 which is driven by a gear box 62 and fluid motor 36. Such receder mechanism is adapted to rotate set shaft 100 in a direction opposite to the direction of rotation of set mechanism 25 and thereby laterally move the upper portion 102 of the carriage, together with a timber mounted thereon, away from the cutting path in a direction laterally outwardly from control station 20.

The sawmill is further preferably provided with a square set gauge mechanism, indicated generally at 68 in FIG. 1, which mechanism comprises a gauge wheel including a peripheral edge precisely aligned with the cutting path established by saw blade 14. In operation, the operator can raise wheel 108 upwardly, by means of a pedal actuator, and then move the inner side of a timber inwardly by means of set mechanism 25 and into engagement with the periphery of gauge wheel 108 and thereby establish a zero reference on the side of the timber with respect to the sawblade. Such square set gauge mechanism is described in detail in my co-pending application Ser. No. 809,247 filed Mar. 21, 1969.

If desired, the sawmill can be provided with a log cleaner mechanism indicated generally at 28 which includes a small relatively wide rotary blade 112 driven by a log cleaner fluid motor 38, said log cleaner mechanism being mounted on a pivoted arm 114. It will be understood that the log cleaner mechanism is used to engage the top of the timber and clean its outer surface of any foreign material along the location to be cut prior to passing the timber through the cutting station.

Referring again to FIG. 1, and more particularly to control station 20, a plurality of manual control levers 51—58, each of which serves to actuate a respective valve means for controlling the flow of pressurized fluid to the fluid motors 31-38 which drive the various individual mechanisms described above.

The operation of the actuators 51—58, their respective valve means, and the hydraulic control systems for the sawmill are described in detail in my co-pending application Ser. No. 809,169 filed Mar. 21, 1969.

Reference is next made to FIGS. 2–6 which illustrate in detail the construction of the three-way delivery conveyor of the present invention. This apparatus comprises a conveyor frame 125 mounted on a base 23 and includes a pair of spaced longitudinally extending guides 120 and 122 best seen in FIG. 5.

Figure 6:
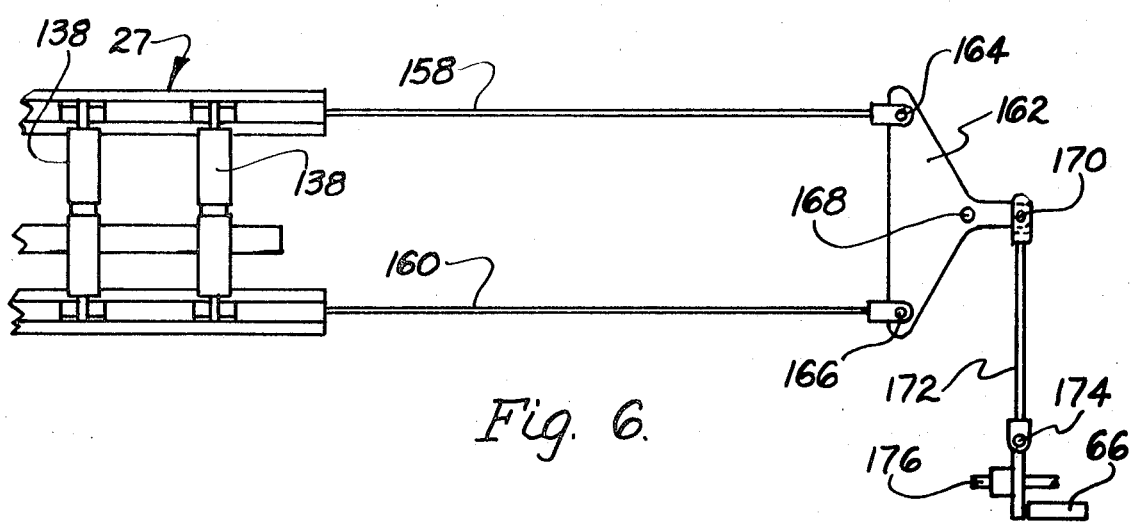
FIG. 6 is a partial view of the conveyor of the preceeding figures which illustrates a control means for the three-way delivery apparatus thereof.

Each of these guides 120 and 122 serves to slideably mount longitudinally extending slides 124 and 126 which are actuated longitudinally of the guides 120 and 122 by the control system shown in detail in FIG. 6, which control system includes a three-way actuating lever 66 positioned in the previously described control station 20 wherein lever 66 is pivotally mounted at a pivot 176.

With continued reference to FIG. 6, when conveyor actuating lever 66 is positioned in its center position the control cables 158 and 160, and the slides 124 and 126 actuated thereby, are positioned as seen in FIGS. 2, 3, and 6 wherein the individual rollers 138 have their axes of rotation perpendicular to the longitudinal axis of the conveyor. When conveyor actuating lever 66 is shifted to the right, as seen in the top view of FIG. 6, right slide 126 is extended and left slide 124 is simultaneously retracted due to the pivoting of lever 162 about its pivot 168, arm 170 on said lever 162 being connected to carriage actuating lever 66 by a control rod 172.

With the right slide 126 extended and the left side 124 retracted it will be understood that each of the individual rollers 138 will be inclined to the left whereby sawn board will be discharged off the left side of the conveyor. Conversely, when conveyor actuating lever 66 is actuated in the opposite direction, thereby extending left slide 124 and retracting right slide 126, then the individual rollers 128 will be inclined to the right thereby functioning to discharge sawn boards from the right side of the end of the conveyor.

Referring particularly to FIG. 5, it will be seen that each of the individual rollers is mounted on left and right pivoted brackets 128 and 130 which are respectively mounted on left slide 124 and right slide 126 by the pivot bolts 136.

Each of the brackets 128 and 130 includes an upstanding flange which carries an inwardly extending bearing pin 132 and 134, each of said bearing pins being extended into a respective bearing 140 mounted in a recess in the end of roller 138.

With continued reference to FIG. 5, each roller 138 is provided with a central pulley groove 142 that includes an individual driving belt 144 driven by a lower pulley 146 mounted on a respective pair of bearing blocks 150 and 152 that include bores 154 in which are rotatably mounted a lower pulley shaft 148.

With continued reference to FIG. 5, it will be noted that the two bearing blocks 150 and 152 for lower pulley 146 are supported on a conveyor frame member 156 which comprises a portion of the conveyor frame 125.

Also, with continued reference to FIG. 5, each of the lower pulley shafts 148, except the last one at the discharge end, mounts a pair of sprockets 155 and 157 and successive chains connect the sprockets on each successive lower shaft 148 so as to drive all of the rollers 138 concurrently.

With continued reference to FIGS. 2 through 6, variable discharge conveyor 27 further includes a variable discharge guide indicated generally at 121 which is pivotally mounted to the conveyor frame at a transverse pivot 133. The variable discharge guide includes a pair of actuating links 159 and 165 best seen in the enlarged view of FIG. 4. Here it will be seen that link 159 includes a first pivotal connection 161 with right slide 126 and a left pivotal connection 163 with the discharge guide 121 eccentrically of its central pivot 169. Similarly, the other actuating link 165 includes a first pivotal connection 168 with left slide 124 and a second pivotal connection with a variable discharge guide 121 at the pivot 167. It will now be understood that when the right slide 126 is extended and left slide 124 is retracted then the links function to shift discharge guide 121 so as to discharge sawn boards to the left. Conversely, when the left slide 124 is extended, and right slide 126 is retracted, then variable discharge guide 121 is shifted so as to discharge sawn boards to the right.

Hence it will be seen that discharge guide 121 is automatically shifted so as to cooperate with the automatic inclination of the angle of rotation of the driven rollers 138 so as to properly selectively discharge sawn boards on the selected side of the conveyor.

Discharge guide 121 is further arranged to recline in a horizontal plane when the conveyor actuating lever 66 is centered such that the then perpendicular driven rollers 138 can discharge sawn boards axially from the ends of the conveyor without interference by the discharge guide 121.

Moreover, such discharge guide is automatically raised to a vertical position at the same time it is angled to the right or to the left by means of the downwardly extending levers 137 and 139 each of which is connected to a respective eyebolt 143 by a respective chain 141 and 151. Each of the eyebolts includes a shank portion extended through the end frame member 125 and is provided with a compression spring 145 interposed between said frame member 125 and a nut 147 screwed on the end of the eyebolt.

It will now understood that when the slides 124 and 126 are extended and retracted then the variable discharge guide 121 is not only angled, in the manner shown in FIG. 4, but is also raised from its normal central lay-down position by means of the levers 137 and 139 and their associated chain, eyebolt, and compression spring mechanisms.

It will be noted from FIG. 3 that the conveyor rollers 138 and their associated lower drive pulleys 146 are powered by means of a belt 129 driven by the previously described conveyor fluid motor, the hydraulic control system of which is described in detail in my co-pending application Ser. No. 809,169 filed Mar. 21, 1969.

In operation, when the operator desires to discharge boards straight off the end of the conveyor the previously described actuating lever 66 is centered thereby evenly positioning the right and left slides 124 and 126 on their respective guides 120 and 122. In this position the sawn boards are carried by the then perpendicular rollers straight off the end of the conveyor.

When the operator desires to discharge boards of a certain size on one side of the conveyor it is merely necessary that he shift lever 66 in a "right" direction so as to incline the rollers and discharge guide 121 so as to effect a right discharge.

Similarly, when the operator desires to discharge boards of a different size on the left side of the conveyor the conveyor actuating lever 66 is merely shifted in the other direction from center.

I claim:

1. A sawmill comprising in combination, frame means including a control station; a saw blade rotatably mounted on said frame means and disposed in a cutting path; a timber supporting carriage mounted on said frame means for movement along said cutting path; a conveyor including a conveyor frame forming spaced longitudinally extending guides; a first slide means mounted for longitudinal movement on said first guide; a second slide means mounted for longitudinal movement on said second guide; a plurality of rollers spaced longitudinally along said frame means, each roller including a first rotatable mounting means carried by said first slide means, a second rotatable mounting means carried by said second slide means, and a central driven portion; driving means disposed beneath said rollers and in driving engagement with said central driven portions of said rollers; and control means including an actuator at said control station for shifting certain of said slide means to vary the angle of the axes of rotation of said rollers relative to the longitudinal axis of said conveyor and thereby vary the direction of discharge from said conveyor.

2. The conveyor defined in claim 1 that includes a discharge guide mounted on said angle means beyond said rollers; and means for varying the angle of said guide relative to the longitudinal axis of said conveyor.

3. The conveyor defined in claim 1 that includes a discharge guide shiftably mounted on said conveyor; and means for shifting the angle of guide responsive to operation of said control to vary said angle of the axes of rotation of said roller.

4. The conveyor defined in claim 1 that includes a centrally pivoted transversely extending guide mounted on said frame means beyond said rollers; and an actuating link including a first pivotal connection with said guide and a second pivotal connection with one of said slides.

5. A sawmill comprising in combination, frame means including a control station; a saw blade rotatably mounted on said frame means and disposed in a cutting path; a timber supporting carriage mounted on said frame means for movement along said cutting path; a conveyor including a conveyor frame forming spaced longitudinally extending guides; a first slide means mounted for longitudinal movement on said first guide; a second slide means mounted for longitudinal movement on said second guide; a plurality of rollers spaced longitudinally along said frame means, each roller including a first rotatable mounting means carried by said first slide means, a second rotatable mounting means carried by said second slide means, and a central driven pulley means; a plurality of driving pulley means mounted on said frame means below said rollers; a plurality of flexible belts each of which connects one of said driven pulley means with a respective one of said driving pulley means, power means for said driving pulley means; and control means including an actuator at said control station for shifting certain of said slide means to vary the angle of the axes of rotation of said rollers relative to the longitudinal axis of said conveyor and thereby vary the direction of discharge from said conveyor.

6. The conveyor defined in claim 5 that includes a discharge guide mounted on said frame means beyond said rollers; and means for varying the angle of said guide relative to the longitudinal axis of said conveyor.

7. The conveyor defined in claim 5 that includes a discharge guide shiftably mounted on said conveyor; and means for shifting the angle of said guide responsive to operation of said control to vary said angle of the axes of rotation of said roller.

8. The conveyor defined in claim 5 that includes a centrally pivoted transversely extending guide mounted on said frame means beyond said rollers; and an actuating link including a first pivotal connection with said guide and a second pivotal connection with one of said slides.

9. A sawmill comprising in combination, frame means including a control station; a saw blade rotatably mounted on said frame means and disposed in a cutting path; a timber supporting carriage mounted on said frame means for movement along said cutting path; a conveyor including a conveyor frame forming spaced longitudinally extending guides; a first slide means mounted for longitudinal movement on said first guide; a second slide means mounted for longitudinal movement on said second guide; a plurality of rollers spaced longitudinally along s aid frame means, each roller including a first rotatable mounting means carried by said first slide means, a second rotatable mounting means carried by said second slide means, and a central driven pulley means; a plurality of driving pulley means mounted on said frame means below said rollers; a plurality of flexible belts each of which connects one of said driven pulley means with a respective one of said driving pulley means; power means for said driving pulley means; and control means including an actuator at said control station and an operator connected between certain of said slides and said actuator.

10. The conveyor defined in claim 9 that includes a discharge guide mounted on said frame means beyond said rollers; and means for varying the angle of said guide relative to the longitudinal axis of said conveyor.

11. The conveyor defined in claim 9 that includes a discharge guide shiftably mounted on said conveyor; and means for shifting the angle of said guide responsive to operation of said control to vary said angle of the axes of rotation of said roller.

12. The conveyor defined in claim 9 that includes a centrally pivoted transversely extending guide mounted on said frame means beyond said rollers; and an actuating link including a first pivoted connection with said guide and a second pivoted connection with one of said slides.

* * * * *